United States Patent Office 3,342,871
Patented Sept. 19, 1967

3,342,871
ORGANIC CYCLOPHOSPHINE SULFIDES AND SELENIDES AND THE PREPARATION THEREOF
Ludwig Maier, Zurich, Switzerland, assignor to Monsanto Company, St. Louis, Mo., a corporation of Delaware
No Drawing. Filed Aug. 25, 1965, Ser. No. 482,618
Claims priority, application Switzerland, Oct. 25, 1962, 12,656/62; Oct. 28, 1963, 13,275/63
13 Claims. (Cl. 260—606.5)

ABSTRACT OF THE DISCLOSURE

Organic cyclophosphine sulfides and selenides, and a process for making by reacting sulfur or selenium with primary organophosphines at a temperature sufficient to give off hydrogen sulfide or hydrogen selenide.

This application is a continuation-in-part of copending application Ser. No. 406,557, filed Oct. 26, 1964 and copending application Ser. No. 318,162, filed Oct. 13, 1963, both now abandoned.

It has been found that organic cyclophosphine sulfides and selenides are obtained by reacting primary organophosphines with elementary sulfur or selenium in a molar ratio of 1:2. The organic cyclophosphine sulfides and selenides correspond to the formula $$[RP(A)]_n$$

wherein R signifies an aliphatic, cycloaliphatic, araliphatic, aromatic or heterocyclic radical, A is sulfur or selenium and $n$ is 3 or 4. The radicals R can possess ethylenic or acetylenic unsaturations and substituents, such as halogen, OH, SH, CN, $NH_2$, CO etc. Moreover, the carbon chains of the radicals R can be interrupted by heteroatoms or heteroatom groups, such as S, O, N, SO, $SO_2$, NH etc.

Any primary phosphine of the formula $RPH_2$, wherein R has the significance defined above, are suitable for the present process. If a mixture of primary phosphines wherein the R groups are different is used, the product will also contain cyclic phosphines wherein R groups are different. Especially desirable phosphines for use in the process of the invention are those wherein the R group is hydrocarbon having not more than 24 carbon atoms, preferably not more than 18 carbons, and for some purposes not more than 8 carbon atoms. Examples of radicals being substituted or interrupted by heteroatoms and occurring in well known primary phosphines are: $F_3C-$, $F_2HCCF_2-$, $Cl_2HCCF_2-$, $CH_3OCH_2CH_2-$ $F_3C(CHF_2)CF-$, $HOCH_2CH_2CH_2-$ $H_2NCH_2CH_2CH_2-$, $NCCH_2CH_2-$, $CH_3OCOCH_2CH_2-$ $ClCH_2CH_2CH_2-$, $4-ClC_6H_4-$

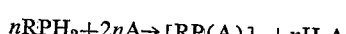, etc.

The reaction of invention proceeds according to the following equation:

$$nRPH_2 + 2nA \rightarrow [RP(A)]_n + nH_2A$$

A compound assumed to be the tetraphenylcyclotetraphosphinetetrasulfide has been reported in the literature (W. Kuchen and H. Buchwald, Chem. Ber. 91, 2296, 1958). In this previous process at first the tetraphenylcyclotetraphosphine has allegedly been prepared by reacting equimolar amounts of phenylphosphine and phenyldichlorophosphine and has then been converted into the sulfur derivative by treating with sulfur. However, it has been shown that aliphatically substituted cyclotetraphosphines (R=alkyl, cycloalkyl or aralkyl) cannot be converted by this method into the corresponding tetrasulfides (K. Issleib and W. Seidel, Z. anorg. allg. Chem. 303, 155, 1960; Z. Naturforschung 15b, 267, 1960). Similarly only a compound assumed to be the tetraphenylcyclotetraphosphinetetraselenide (R=phenyl) has been described in the literature until now. (H. C. Krauss and H. Jung. Z. Naturf. 15b, 545, 1960.) This selenide of the prior art was prepared in an analogous manner to the sulfide of the prior art.

Contrarily, primary organophosphines can be converted by the novel process, using a single reaction step, into the corresponding cyclic phosphine sulfides or selenides.

In carrying out the reaction, the reactants in a suitable stoichiometric proportion are mixed, whereafter the exothermic reaction starts at ambient temperature. It is expedient to subsequently heat the reaction mixture for a short time at a higher temperature, e.g. 60–120° C. One can work with or without a solvent. Suitable solvents are those which react neither with the primary phosphine nor with sulfur or selenium, such as benzene, toluene, xylene, methylchloride, ether, etc. The aromatic derivatives having the formula $[Aryl\ PS]_3$ can be worked up by crystallization or sublimation, while the aliphatic derivatives having the formula $[Alkyl\ PS]_4$, according to the number of carbon atoms and structure of the radicals, often can be distilled under reduced pressure.

The products resulting from the process are liquid or solid, according to the organo groups which are present. They can be used as heat transferring liquids at high temperatures, lubricant additives for thermally highly stressed machine parts, hydraulics, agents for textiles, anti-foamants, anti-oxidants, stabilizers, accelerators in vulcanization, plasticizers, hydrophobing agents, flameproofing agents, active ingredients of pesticides such as insecticides and fungicides, and means for combatting undesired plant growth. The novel compounds having unsaturated and/or else reactive substituents are valuable intermediates for the preparation of polymers.

Example 1

A mixture of 11 g. of $C_6H_5PH_2$ (0.1 mole) and 6.4 g. of sulfur (0.2 mole) in 100 ml. of benzene is heated gradually up to 60° C. A vigorous reaction ensues with evolution of hydrogen sulfide. After stirring for 30 minutes at room temperature, most of the benzene is distilled off under reduced pressure. Then, ether is added and the solution cooled with ice. There are obtained 9.5 g. (=68%) of $[C_6H_5PS]_3$ which melts after recrystallization in benzene at 148° C. (literature 150.5° C.; W. Kuchen and H. Buchwald, Chem. Ber. 91, 2296, 1958).

*Analysis* $C_{18}H_{15}P_3S_3$ (420.4).—Calc. percent: C, 51.42; H, 3.59; S, 22.87. Found percent: C, 52.12; H, 3.14; S, 23.07.

Example 2

Upon mixing 14.6 g. of n-$C_8H_{17}PH_2$ (0.1 mole) and 6.4 g. of sulfur (0.2 mole) reaction occurs at room temperature with evolution of hydrogen sulfide. In order to complete the reaction the mixture is heated at 100° C. for 1 hour. The distillation of the viscous liquid gives pure tetraoctylcyclotetraphosphine tetrasulfide in a practically quantitative yield; B.P. 245–250° C./0.1 mm. $n_D^{20}$ 1.5513.

*Analysis* $C_{32}H_{68}P_4S_4$ (705.0).—Calc. percent: C, 54.51; H, 9.72; S, 18.19. Found percent: C, 54.56; H, 9.76; S, 18.44.

The determination of the molecular weight in benzene gave 703 (average of 3 determinations).

Example 3

A mixture of 5.4 g. (0.06 mole) of $C_4H_9PH_2$ (a mixture of 95% iso- and 5% n-butylphosphine) and 3.84 g. of sulfur (0.12 mole) in 50 ml. of benzene is gradually heated up to 80° C., thereby hydrogen sulfide is released. The fractional distillation of the solution yields 7.1 g. (=97%) of tetrabutylcyclotetraphosphine tetrasulfide; B.P. 149–152° C./0.02 mm.; M.P. 78–82° C. $n_D^{20}$ 1.5919.

Analysis $C_{16}H_{36}P_4S_4$ (480.6).—Calc. percent: C, 39.98; H, 7.55; S, 26.68. Found percent: C, 40.43; H, 7.61; S, 26.71.

The determination of the molecular weight in benzene gave 451 (average of 3 determinations).

Example 4

On combination of 11 g. (0.1 mole) $C_6H_5PH_2$ and 16 g. (0.2 mol) of pulverized red selenium in 100 ml. of benzene, there occurs an exothermic reaction with a development of hydrogen selenide, so that the temperature of the mixture rises to about 50° C. The mixture is heated on a reflux until no further significant amount of hydrogen selenide is developed, which is the case after about 2 hours. After filtering off a small amount of the nonreacted selenium the solvent is distilled off. 15 g. (80%) $[C_6H_5PSe]_3$ are obtained. After recrystallization from carbon disulfide/petroleum ether the compound melts at 74–77° C. (Literature reference cited 71–72° C.)

Analysis $C_{18}H_{15}P_3Se_3$.—Calc. percent: C, 38.52; H, 2.70; P, 16.56; Se, 42.22. Found percent: C, 40.26; H, 3.64; P, 17.01; Se, 38.93.

Example 5

A mixture of 10.1 g. (0.05 mole) of $n-C_{12}H_{25}PH_2$ and 3.2 g. (0.1 mole) of sulfur in 40 ml. of benzene is refluxed. After one hour a clear solution is obtained. The benzene is distilled off and a colorless viscous liquid remains which crystallizes after 3 days standing at room temperature. Yield 11.6 g. (100%); of tetra-n-dodecylcyclotetraphosphine tetrasulfide; M.P. 30–32° C.

The same compound is also obtained on working without a solvent. A few minutes after having mixed the reactants a vigorous exothermic reaction ensues with the evolution of $H_2S$. All the sulfur is dissolved and a clear viscous liquid is obtained which crystallizes after some time; M.P. 30–32° C. The yield is quantitative.

Analysis $C_{48}H_{100}P_4S_4$ (929.44).—Calc'd. percent: C, 62.02; H, 10.84; S, 13.79. Found percent: C, 61.32; H, 10.40; S, 15.58.

Example 6

Upon mixing 9.3 g. (0.075 mole) of $C_6H_5CH_2PH_2$ and 4.8 g. (0.15 mole) of sulfur an exothermic reaction starts at room temperature with evolution of $H_2S$. The reaction is completed by heating for one hour at 100° C. A viscous liquid is obtained which crystallizes on cooling to 0° C. Yield 14.1 g. (100%) of $[C_6H_5CH_2PS]_n$; M.P. 28° C.

What is claimed is:

1. A compound of the formula $$[RP(A)]_n$$

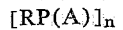

wherein R is selected from the class consisting of aliphatic, cycloaliphatic and araliphatic radicals, A is selected from the class consisting of sulfur and selenium, and n is 3 or 4.

2. A compound of claim 1 wherein R is alkyl having not more than 24 carbon atoms.
3. A compound of claim 1 wherein R is alkyl having not more than 8 carbon atoms.
4. Tetra-n-octylcyclotetraphosphine tetrasulfide.
5. Tetraisobutylcyclotetraphosphine tetrasulfide.
6. Tetra-n-dodecylcyclotetraphosphine tetrasulfide.
7. A process for making compounds of the formula $$[RP(A)]_n$$

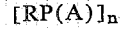

wherein R is selected from the class consisting of aliphatic, cycloaliphatic and araliphatic radicals, A is selected from the class consisting of sulfur and selenium and n is 3 or 4, comprising mixing at a temperature at which hydrogen sulfide or hydrogen selenide is given off a compound of the formula $RPH_2$ wherein R is as defined hereinabove with a material selected from the class consisting of selenium and sulfur.

8. A process of claim 7 wherein the molar ratio of the primary phosphine to sulfur is about 1:2.
9. A process of claim 7 wherein the reaction is carried out in the presence of an inert solvent.
10. A process of claim 7 wherein the reaction is carried out at a temperature in the range of 40 to 120° C.
11. A process of claim 7 wherein R has not more than 24 carbon atoms.
12. A process of claim 7 wherein R is alkyl hydrocarbon having not more than 8 carbon atoms.
13. A process of claim 7 wherein R is aralkyl hydrocarbon having not more than 8 carbon atoms.

References Cited

Kohler et al., Chemische Berichte, vol. 10, page 807 (1877).

TOBIAS E. LEVOW, *Primary Examiner.*

W. F. W. BELLAMY, *Assistant Examiner.*